United States Patent
Thevoz

(10) Patent No.: US 12,118,530 B2
(45) Date of Patent: *Oct. 15, 2024

(54) ADVANCED METHODS, SYSTEMS AND DEVICES FOR REGISTERING INFORMATION IN A DATABASE

(71) Applicant: SICPA HOLDING SA, Prilly (CH)

(72) Inventor: Philippe Thevoz, Penthalaz (CH)

(73) Assignee: SICPA HOLDING SA, Prilly (CH)

( * ) Notice: Subject to any disclaimer, the term of this patent is extended or adjusted under 35 U.S.C. 154(b) by 533 days.

This patent is subject to a terminal disclaimer.

(21) Appl. No.: 16/492,481

(22) PCT Filed: Nov. 22, 2017

(86) PCT No.: PCT/EP2017/080043
§ 371 (c)(1),
(2) Date: Sep. 9, 2019

(87) PCT Pub. No.: WO2018/162099
PCT Pub. Date: Sep. 13, 2018

(65) Prior Publication Data
US 2020/0051056 A1 Feb. 13, 2020

(30) Foreign Application Priority Data

Mar. 8, 2017 (EP) .................................... 17159825
May 24, 2017 (EP) .................................... 17172713

(51) Int. Cl.
*G06Q 20/26* (2012.01)
*G06F 16/23* (2019.01)
(Continued)

(52) U.S. Cl.
CPC ......... *G06Q 20/26* (2013.01); *G06F 16/2365* (2019.01); *G06F 16/2379* (2019.01); *G06F 16/2457* (2019.01); *G06Q 20/24* (2013.01)

(58) Field of Classification Search
None
See application file for complete search history.

(56) References Cited

U.S. PATENT DOCUMENTS

| 7,069,252 B2 | 6/2006 | Ishimi et al. |
| 2004/0068452 A1* | 4/2004 | Ullrich .................. G06Q 40/00 705/35 |

(Continued)

FOREIGN PATENT DOCUMENTS

| CN | 1214583 | 4/1999 |
| CN | 1440535 | 9/2003 |

(Continued)

OTHER PUBLICATIONS

Banuelos, "Optimized Execution of Business Processes on Blockchain", arXiv: 1612.03152, Cornell University, Dec. 2016. (Year: 2016).*

(Continued)

*Primary Examiner* — Kito R Robinson
*Assistant Examiner* — Shacole C Tibljas
(74) *Attorney, Agent, or Firm* — Muncy, Geissler, Olds & Lowe, P.C.

(57) ABSTRACT

A method and system are provided for registering, in a database, a transaction between two parties, and for allowing a third party to cause an action to be performed in relation to the transaction. The method comprise a step of creating (s2) a transaction record, steps of electronically signing (s4, s12, s18, s26) the transaction record, steps of registering (s6, s14, s20, s28) the transaction record in the database, steps of issuing a notification (s8, s16, s22) that the transaction record has been registered in the database, steps of verifying (s10, s24) the transaction record by the third party, and a step of causing (s30), by the third party, an action to be performed based on transaction content information.

12 Claims, 7 Drawing Sheets

(51) Int. Cl.
  *G06F 16/2457*  (2019.01)
  *G06Q 20/24*  (2012.01)

(56) References Cited

U.S. PATENT DOCUMENTS

| | | |
|---|---|---|
| 2008/0208760 A1 | 8/2008 | Keithley |
| 2012/0089519 A1 | 4/2012 | Peddada |
| 2015/0294425 A1 | 10/2015 | Benson |
| 2015/0324789 A1 | 11/2015 | Dvorak et al. |
| 2016/0292680 A1 | 10/2016 | Wilson, Jr. et al. |
| 2017/0033932 A1* | 2/2017 | Truu ............ H04L 9/3239 |
| 2017/0187535 A1* | 6/2017 | Middleton ........ G06Q 20/10 |
| 2017/0193469 A1* | 7/2017 | Hernandez ....... G06Q 20/401 |
| 2018/0075028 A1* | 3/2018 | Ruschin ........... G06F 21/64 |
| 2018/0075536 A1* | 3/2018 | Jayaram .......... G06Q 20/26 |
| 2018/0089644 A1* | 3/2018 | Chen ............. G06Q 20/24 |

FOREIGN PATENT DOCUMENTS

| | | |
|---|---|---|
| DE | 102014017710 | 6/2016 |
| JP | 2005173752 | 6/2005 |
| JP | 2016200954 | 12/2016 |
| KR | 20160095720 | 8/2016 |
| WO | 2003094063 | 11/2003 |
| WO | 2016170538 | 10/2016 |

OTHER PUBLICATIONS

Satoshi Nakamoto, "Bitcoin: A peer-to-peer electronic cash system." (2008), 9 pages.
Joseph Poon et al.; "The Bitcoin Lightning Network: Scalable Off-Chain Instant Payments", Jan. 14, 2016 (Jan. 14, 2016), 59 pages.
Pedro Franco; "Understanding Bitcoin: Cryptography, Engineering and Economics" In: "Understanding Bitcoin: Cryptography, Engineering and Economics", Nov. 24, 2014 (Nov. 24, 2014), Wiley, 144 pages.
International Search Report and Written Opinion issued on Feb. 13, 2018 with respect to application No. PCT/EP2017/080043, 10 pages.
Japanese Office Action issued in corresponding Japanese Application No. 2019-545332 dated Dec. 21, 2021 (and English language translation of the Office Action).
Chinese Patent Office Action in counterpart Chinese Application No. CN 201780088142.X. dated Jan. 28, 2023 (and English language translation of Office Action).

* cited by examiner

ADVANCED METHODS, SYSTEMS AND DEVICES FOR REGISTERING INFORMATION IN A DATABASE

TECHNICAL FIELD

The present invention relates to the field of applied computer science. In particular, the invention relates to registering, i.e. recording, information in a computer-implemented database.

BACKGROUND

The blockchain technology is used as a core component of the now well-known digital currency bitcoin. In the bitcoin system, the blockchain serves as a public ledger for all transactions (see Satoshi Nakamoto, "Bitcoin: A peer-to-peer electronic cash system." (2008), retrieved on Mar. 2, 2017 from https://bitcoin.org/bitcoin.pdf).

The blockchain technology has inspired research in applied computer science, especially in the fields of databases, cryptography, and computer networks. Some of these research activities have focused on solving various technical problems relating to the implementation of reliable, secure and efficient computer-implemented methods, systems, and devices for registering, i.e. recording, transactions in a computer-implemented database.

SUMMARY

To address or at least partially address the above-mentioned problems, methods, systems, and electronic devices according to the invention are defined in the independent claims. Particular embodiments are defined in the dependent claims.

In one embodiment, a method is provided for registering, in a database, a transaction between a first party, hereinafter referred to as "Alice", and a second party, hereinafter referred to as "Bob", and for allowing a third party, hereinafter referred to as "Carol", to cause an action to be performed in relation to the transaction. Each of Alice, Bob, and Carol has an electronic device capable of communicating with the database over a communication network and capable of electronically signing data to be sent over the communication network. The method comprises the following steps.

Alice's electronic device causes a record, hereinafter referred to as "transaction record", to be created. The transaction record comprises: (i) an identifier, hereinafter referred to as "transaction identifier", for identifying the transaction, (ii) an identifier for identifying Alice, (iii) an identifier for identifying Bob, and (iv) Information, hereinafter referred to as "transaction content information", relating to at least one of: the nature of the transaction and a value that the transaction is considered to have. Alice's electronic device then electronically signs the transaction record. The resulting transaction record is hereinafter referred to as "$TR_{kA}$". $TR_{kA}$ is then registered in the database.

Carol's electronic device is then notified that $TR_{kA}$ has been registered in the database. $TR_{kA}$ is determined to be in accordance with a rule or set of rules and to have been electronically signed by Alice's electronic device. Carol's electronic device then electronically signs $TR_{kA}$. The resulting transaction record is hereinafter referred to as "$TR_{kA,kC1}$". $TR_{kA,kC1}$ is then registered in the database.

Bob's electronic device is then notified that $TR_{kA,kC1}$ has been registered in the database. $TR_{kA,kC1}$ is then electronically signed by Bob's electronic device, the resulting transaction record being hereinafter referred to as "$TR_{kA,kC1,kB}$". $TR_{kA,kC1,kB}$ is then registered in the database.

Carol's electronic device is then notified that $TR_{kA,kC1,kB}$ has been registered in the database. $TR_{kA,kC1,kB}$ is determined to have been electronically signed by Bob's electronic device. $TR_{kA,kC1,kB}$ is then electronically signed by Carols electronic device, the resulting transaction record being hereinafter referred to as "$TR_{kA,kC1,kB,kC2}$". $TR_{kA,kC1,kB,kC2}$ is then registered in the database. Carol's electronic device then causes an action to be performed, wherein the action is based on the transaction content information and is associated with levying a tax by Carol.

One of the advantages of the method is that it reduces the latency (i.e., the delay) in the process of recording of a transaction. Additional advantages of the method will become apparent from the detailed description below.

In one embodiment, a system is provided for registering, in a database, a transaction between a first party ("Alice") and a second party ("Bob"), and for allowing a third party ("Carol") to cause an action to be performed in relation to the transaction, wherein each of Alice, Bob, and Carol has an electronic device capable of communicating with the database over a communication network and capable of electronically signing data to be sent over the communication network. The system is configured for performing the steps as described above.

The invention also relates in other embodiments to methods for participating in registering, in the database, such a transaction and for participating in allowing the third party ("Carol") to cause an action to be performed in relation to the transaction, wherein the methods are carried out by any one of: Alice's electronic device, Carol's electronic device, and Bob's electronic device.

The invention further relates in further embodiments to electronic devices for participating in registering, in the database, such a transaction and for participating in allowing the third party ("Carol") to cause an action to be performed in relation to the transaction, wherein the electronic devices are usable as any one of: Alice's electronic device, Carol's electronic device, and Bob's electronic device.

The invention also relates to computer programs or sets of computer programs comprising computer-readable instructions configured, when executed on an electronic device or set of electronic devices, to cause the electronic device or set of electronic devices to carry out any one of the above-described methods.

In some embodiments, as defined for example in dependent claim 6, the transaction relates to an object, and the object is marked with a code representing, or corresponding to, the transaction identifier. The code marked on the object may then be read, for example when the object is shipped by Alice, and it may then be determined, by querying the database, whether the object's nature matches the transaction content information of the transaction identified by the transaction identifier represented by, or corresponding to, the read code. The object's nature may for example be determined by visual inspection of the object. Thus, in real-time or quasi real-time, a transaction may be registered, and it may later be checked whether the registered transaction correctly corresponds to an actual transaction.

BRIEF DESCRIPTION OF THE DRAWINGS

Embodiments of the present invention shall now be described, in conjunction with the appended figures, in which.

DETAILED DESCRIPTION

The present invention will now be described in conjunction with specific embodiments. These specific embodiments serve to provide the skilled person with a better understanding, but are not intended to restrict the scope of the invention, which is defined by the appended claims. A list of abbreviations and their meaning is provided at the end of the detailed description for the sake of convenience.

Figure 1A:
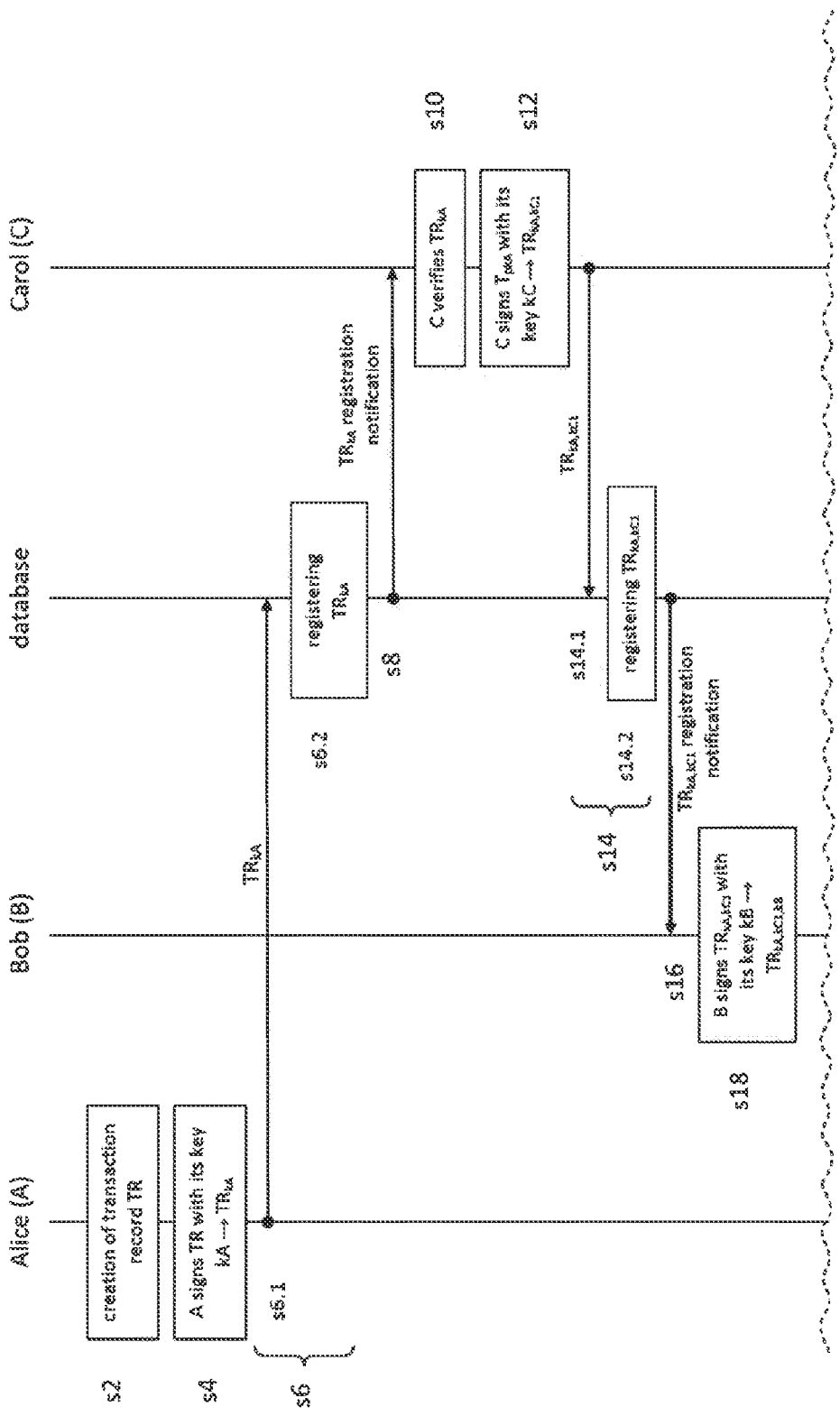
FIGS. 1a and 1b, which are to be read together, constitute a message sequence chart of a method in one embodiment of the invention.
Figure 1B:
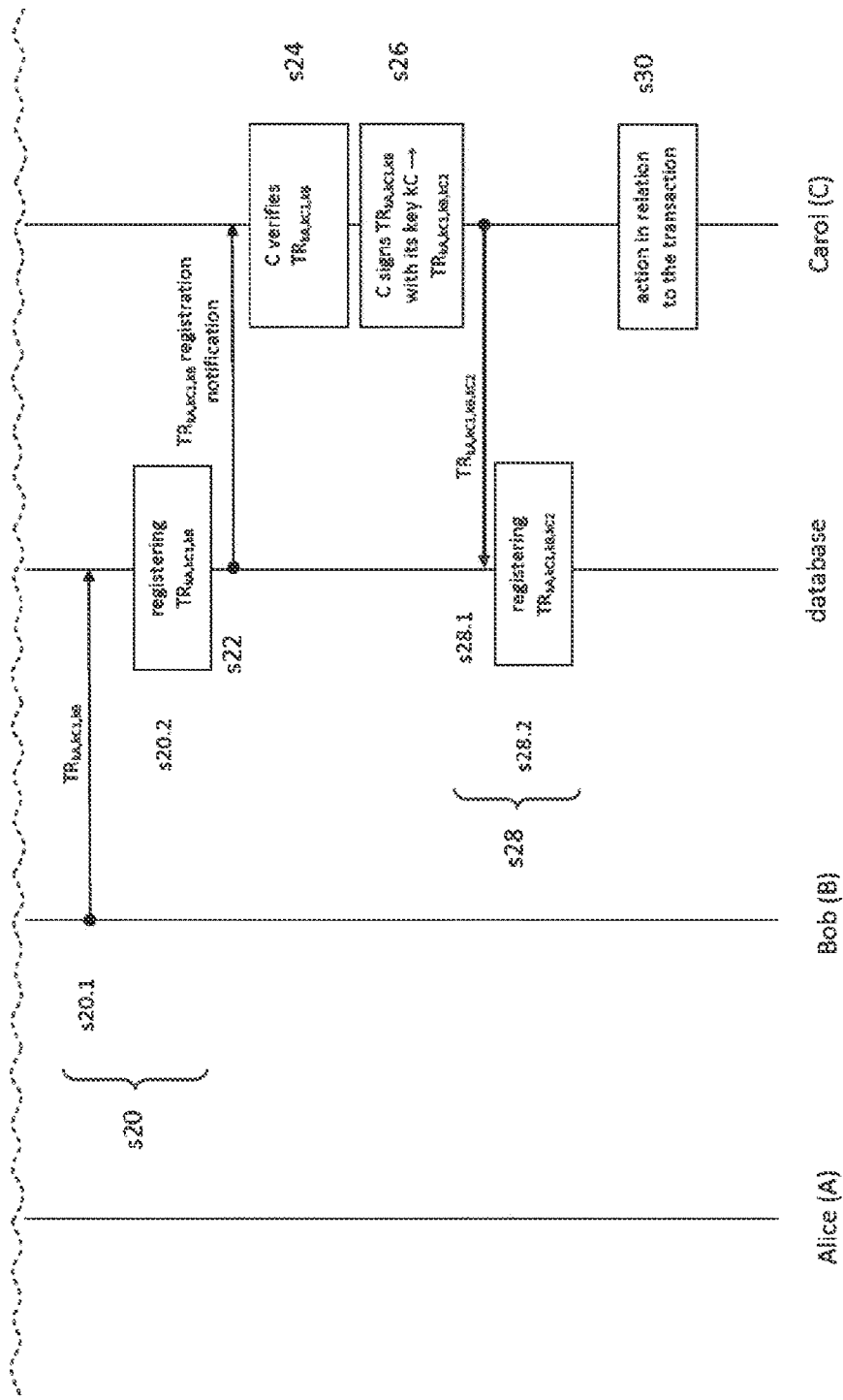

FIGS. 1a and 1b, which are to be read together, constitute a message sequence chart of a method in one embodiment of the invention. The method's aim is, firstly, to register, i.e. to record, in a database a transaction between a first party and a second party and, secondly, to allow a third party to cause an action to be performed in relation to the transaction. The first, second, and third parties (or, in other words, the actors) are referred to as Alice, Bob, and Carol respectively, purely for the sake of convenience.

The database is a computer-implemented database. Many forms of computer-implemented databases may be used. In one embodiment, the database is a distributed database. In one embodiment, the database is a distributed ledger (also called shared ledger). In one embodiment, the database is a shared permissioned ledger. In one embodiment, the database is a blockchain-based database, such as for example a public blockchain-based database, or a private blockchain-based database (such as for example a blockchain operated by a private consortium). In one embodiment, the database is a database (or ledger) secured by a blockchain (as described for example in US 2017/0033932 A1). In one embodiment, the database is immutable to a certain extent. This means that, after content has been recorded into the database, it is very difficult or computationally very demanding to alter said content.

Each of Alice, Bob, and Carol has an electronic device capable of communicating with the database over a communication network. Many forms of electronic devices may be used, such as for example a personal computer, a laptop computer, a mobile phone, a smartphone, a tablet computer, a personal digital assistant, a wearable computer, a gaming device, a portable media player, a set-top box, and/or a camera. In one embodiment, Alice's, Bob's, and Carol's electronic devices are interconnected over one or more communication networks. Many forms of communication networks may be used as well, such as for example, but not limited to, the Internet and/or any kind of wired or wireless communication networks.

Each of Alice's, Bob's, and Carol's electronic devices is capable of electronically signing data on behalf of Alice, Bob and Carol respectively. For example, each of Alice, Bob, and Carol has a key, i.e. a key usable for digitally signing data. In one embodiment, each of Alice's, Bob's, and Carol's key is a private key, and each of Alice, Bob, and Carol also has a public key, both usable together in the framework of a public key cryptography, or asymmetric cryptography, system.

In one embodiment, electronically signing data comprises digitally signing it using a key, such as for example a private key as mentioned above.

In another embodiment, electronically signing data does not involve the use of a key. For example, electronically signing data may follow from the authentication of a user inputting some kind of user credentials, such as for example a username and a matching password, or biometric data. Following the authentication, the data may then be appended, as a form of electronic signature, with signature data indicating that the authentication took place.

In one embodiment, the transaction comprises a sale of a product or service. For example, Alice may be the seller, Bob may be the buyer, and Carol may be the tax authority.

The method comprises the following steps s2, s4, s6, s8, s10, s12, s14, s16, s18, s20, s22, s24, s26, s28, and s30, which may be described step by step as follows, with reference to FIGS. 1a and 1b. In the following, when it is described that an electronic device performs a step, the step may be executed automatically for example by means of one or more computer programs executing on the electronic device, or by means of one or more integrated circuits (or the like) comprised in the electronic device. In some embodiments, for one or more steps of the method, a user may optionally be required to provide some input for a step to be completed.

Step s2

In step s2, Alice's electronic device causes a record, here referred to as "transaction record", to be created. The record is a data structure that can be stored in the database.

In one embodiment, the transaction record is created by Alice's electronic device.

In another embodiment (not illustrated in FIG. 1a), the transaction record is not created by Alice's electronic device itself. In that embodiment. Alice's electronic device may for example transmit, to the database, parameters required to create a transaction record. The database, or a computer program associated with or managing the database, then creates the transaction record. For example, a computer program managing the database may contain a set of instructions, i.e. a protocol, to create the transaction record. The transaction record, or a copy thereof, is then transmitted to Alice's electronic device for signature (according to step s4).

The transaction record is a data structure comprising: (i) an identifier, here referred to as "transaction identifier, for identifying the transaction, (ii) an identifier for identifying Alice, (iii) an identifier for identifying Bob, and (iv) information, here referred to as "transaction content information", relating to at least one of" the nature of the transaction and a value that the transaction is considered to have. The identifiers are unique identifiers so that they effectively allow in practice the identification of the transaction, of Alice, and of Bob, respectively.

In one embodiment, the transaction record may be referred to as a so-called "smart contract", so that creating a transaction record may also be referred to as initiating a smart contract. In one embodiment, the transaction content information comprises a description of the product or service, its price, and the value-added tax (VAT), also called goods and services tax (GST), applicable to the transaction.

Step s4

In step s4, Alice's electronic device electronically signs the transaction record, for example using Alice's key. The resulting transaction record, i.e. the electronically signed transaction record, is here referred to as "$TR_{kA}$". When a transaction record is electronically signed, the data structure making up the transaction record is expanded in such a manner that the data structure also comprises the electronic signature. In other words, $TR_{kA}$ comprises at least the original transaction record (TR) (the status of which may have changed in the meantime) and the electronic signature of the transaction record by Alice's electronic device, for example using Alice's key (kA).

Step s6

In step s6 (illustrated by sub-steps s6.1 and s6.2 in FIG. 1a), $TR_{kA}$ is registered, i.e. recorded, in the database. In one embodiment, Alice's electronic device causes $TR_{kA}$ to be registered in the database.

In one embodiment, registering $TR_{kA}$ in the database is performed by Alice's electronic device, such as for example by a computer program executing on Alice's electronic device as an automatic consequence of signing step s4.

In another embodiment, registering $TR_{kA}$ in the database is not performed by Alice's electronic device itself, but delegated to another electronic device as an automatic consequence of signing operation s4. For example, registering $TR_{kA}$ in the database may be delegated to a computer program associated with the database.

Step s8

In step s8, Carol's electronic device is then notified that $TR_{kA}$ has been registered in the database.

In one embodiment (not illustrated in FIG. 1a), $TR_{kA}$ is transmitted to Carol's electronic device. $TR_{kA}$ may be transmitted to Carol's electronic device for example by Alice's electronic device, or by the database, or by a computer program associated with or managing the database. For example, a computer program managing the database may contain a set of instructions, i.e. a protocol, to transmit $TR_{kA}$. The invention is however not limited to these implementations. For example, in yet another implementation, Bob's electronic device may be required to approve the transaction before sending $TR_{kA}$ to Carol's electronic device.

The transmission of $TR_{kA}$ to Carol's electronic device may be implemented by any type of message.

In another embodiment, $TR_{kA}$ itself is not transmitted to Carol's electronic device, but only information that $TR_{kA}$ is available, i.e. has been registered. In the database is transmitted to Carol's electronic device. In such a manner, Carol's electronic device is informed that the transaction record has been created, has been electronically signed by Alice's electronic device, and is ready to be electronically signed by Carol's electronic device. Information that $TR_{kA}$ has been registered in the database may be transmitted to Carol's electronic device for example by Alice's electronic device (not illustrated in FIG. 1a), or by the database (as illustrated in FIG. 1a), or by a computer program associated or managing with the database. For example, a computer program managing the database may contain a set of instructions, i.e. a protocol, to transmit said information. The invention is however not limited to these implementations. For example, in yet another implementation, Bob's electronic device may be required to approve the transaction before notification to Carol's electronic device (not illustrated in FIG. 1a).

The notification to Carol's electronic device that $TR_{kA}$ has been registered in the database may be implemented by any type of message.

Step s10

In step s10, $TR_{kA}$ is determined to be in accordance with a rule or set of rules and to have been electronically signed by Alice's electronic device.

Step s10 may be performed by Carol's electronic device (for example after fetching $TR_{kA}$ from the database, if not already available to Carol's electronic device), or by the database, or by a computer program associated with or managing the database. The performance of step s10 may alternatively be delegated to yet another network element.

In one embodiment, step s10 is performed as soon as Carol's electronic device has been notified that $TR_{kA}$ has been registered in the database.

In one embodiment, if it is determined that $TR_{kA}$ is not in accordance with a rule or set of rules and/or has not been electronically signed by Alice's electronic device, the whole process may for example be interrupted.

Step s12

Then, in step s12, $TR_{kA}$ is further electronically signed by Carol's electronic device, for example using Carol's key. That is, Carol's electronic device electronically signs $TR_{kA}$. The resulting transaction record, i.e. the further electronically signed transaction record, is here referred to as "$TR_{kA,kC1}$".

$TR_{kA,kC1}$ comprises at least original transaction record $TR_{kA}$ (the status of which may have changed in the meantime) and the electronic signature of $TR_{kA}$ by Carol's electronic device, for example using Carol's key (kC).

Step s14

In step s14 (illustrated by sub-steps s14.1 and s14.2 in FIG. 1a), $TR_{kA,kC1}$ is registered, i.e. recorded, in the database. In one embodiment, Carol's electronic device causes $TR_{kA,kC1}$ to be registered in the database.

In one embodiment, registering $TR_{kA,kC1}$ in the database is performed by Carol's electronic device, such as for example by a computer program running on Carol's electronic device as an automatic consequence of the signing operation s12.

In another embodiment, registering $TR_{kA,kC1}$ in the database is not performed by Carol's electronic device itself, but by another electronic device as an automatic consequence of signing step s12.

Step s16

In step s16, Bob's electronic device is then notified that $TR_{kA,kC1}$ has been registered in the database.

In one embodiment (not illustrated in FIG. 1a), $TR_{kA,kC1}$ is transmitted to Bob's electronic device. $TR_{kA,kC1}$ may be transmitted to Bob's electronic device for example by Carols electronic device, or by the database, or by a computer program associated with or managing the database. The invention is however not limited to these implementations.

The transmission of $TR_{kA,kC1}$ to Bob's electronic device may be implemented by any type of message.

In another embodiment, $TR_{kA,kC1}$ itself is not transmitted to Bob's electronic device, but only information that $TR_{kA,kC1}$ is available, i.e. has been registered, in the database is transmitted to Bob's electronic device. In such a manner, Bob's electronic device is informed that the transaction record has been created and is ready to be electronically signed by Bob's electronic device. Information that $TR_{kA,kC1}$ has been registered in the database may be transmitted to Bob's electronic device for example by Carol's electronic device (not illustrated in FIG. 1a), or by the database (as illustrated in FIG. 1a), or by a computer program associated with or managing the database. The invention is however not limited to these implementations.

The notification to Bob's electronic device that $TR_{kA,kC1}$ has been registered in the database may be implemented by any type of message.

Step s18

In step s18, $TR_{kA,kC1}$ is further electronically signed by Bob's electronic device, for example using Bob's key. That is, Bob's electronic device electronically signs $TR_{kA,kC1}$. This may for example be performed after fetching $TR_{kA,kC1}$ from the database, if not already available to Bob's electronic device. The resulting transaction record, i.e. the further electronically signed transaction record, is here referred to as "$TR_{kA,kC1,kB}$".

$TR_{kA,kC1,kB}$ comprises at least original transaction record $TR_{kA,kC1}$ (the status of which may have changed in the meantime) and the electronic signature of $TR_{kA,kC1}$ by Bob's electronic device.

In one embodiment, Bob's electronic device electronically signs $TR_{kA,kC1}$ only if Bob agrees with the transaction, either by requiring Bob's consent (through a user interface interaction), or by applying a rule set in advance on Bob's electronic device (for example in the form of software-implemented determination). If Bob does not consent to the transaction, the whole process may be interrupted or aborted.

In one embodiment, the approval of the transaction may be deferred until Bob is satisfied that the transaction has took place or will take place, such as for example until Bob is satisfied that the object or service has been or will be duly delivered or provided.

Step s20

In step s20 (illustrated by sub-steps s20.1 and s20.2 in FIG. 1b), $TR_{kA,kC1,kB}$ is registered, i.e. recorded, in the database. In one embodiment, Bob's electronic device causes $TR_{kA,kC1,kB}$ to be registered in the database.

In one embodiment, registering $TR_{kA,kC1,kB}$ in the database is performed by Bob's electronic device, such as for example by a computer program running on Bob's electronic device as an automatic consequence of signing step s18.

In another embodiment, registering $TR_{kA,kC1,kB}$ in the database is not performed by Bob's electronic device itself, but by another electronic device as an automatic consequence of signing step s18.

Step s22

In step s22, Carol's electronic device is then notified that $TR_{kA,kC1,kB}$ has been registered in the database.

In one embodiment (not illustrated in FIG. 1b), $TR_{kA,kC1,kB}$ is transmitted to Carol's electronic device. $TR_{kA,kC1,kB}$ may be transmitted to Carol's electronic device for example by Bob's electronic device, or by the database, or by a computer program associated with or managing the database. The invention is however not limited to these implementations.

The transmission of $TR_{kA,kC1,kB}$ to Carol's electronic device may be implemented by means of any type of message.

In another embodiment, $TR_{kA,kC1,kB}$ itself is not transmitted to Carol's electronic device, but only information that $TR_{kA,kC1,kB}$ is available, i.e. has been registered, in the database is transmitted to Carol's electronic device. In such a manner, Carol's electronic device is informed that $TR_{kA,kC1,kB}$ is ready to be electronically signed by Carol's electronic device. Information that $TR_{kA,kC1,kB}$ has been registered in the database may be transmitted to Carol's electronic device for example by Bob's electronic device (not illustrated in FIG. 1b), or by the database (as illustrated in FIG. 1b), or by a computer program associated with or managing the database. The invention is however not limited to these implementations.

The notification to Carol's electronic device that $TR_{kA,kC1,kB}$ has been registered in the database may be implemented by means of any type of message.

Step s24

In step s24, $TR_{kA,kC1,kB}$ is determined to have been electronically signed by Bob's electronic device.

This determination may be performed by Carol's electronic device (for example after fetching $TR_{kA,kC1,kB}$ from the database, if not already available to Carols electronic device), or by the database, or by a computer program associated with or managing the database. The performance of step s24 may even be delegated to yet another network element.

In one embodiment, step s24 is performed as soon as Carol's electronic device has been then notified that $TR_{kA,kC1,kB}$ has been registered in the database.

In one embodiment, if it is determined that $TR_{kA,kC1,kB}$ has not been electronically signed by Bob's electronic device, the whole process may for example be interrupted or aborted.

Step s26

Then, in step s26, $TR_{kA,kC1,kB}$ is further electronically signed by Carol's electronic device, for example using Carol's key. That is, Carol's electronic device electronically signs $TR_{kA,kC1,kB}$. The resulting transaction record, i.e. the further electronically signed transaction record, is here referred to as "$TR_{kA,kC1,kB,kC2}$".

$TR_{kA,kC1,kB,kC2}$ comprises at least original transaction record $TR_{kA,kC1,kB}$ (the status of which may have changed in the meantime) and the electronic signature of $TR_{kA,kC1,kB}$ by Carol's electronic device. In other words, the electronic signature of $TR_{kA,kC1,kB}$ by Carol's electronic device generally differs from the electronic signature of $TR_{kA}$ by Carol's electronic device (see above step s12) because the data that is electronically signed is different.

Step s28

In step s28 (illustrated by sub-steps s28.1 and s28.2 in FIG. 1b), $TR_{kA,kC1,kB,kC2}$ is then registered in the database. In one embodiment, Carol's electronic device causes $TR_{kA,kC1,kB,kC2}$ to be registered in the database.

In one embodiment, registering $TR_{kA,kC1,kB,kC2}$ in the database is performed by Carol's electronic device, such as for example by a computer program running on Carol's electronic device as an automatic consequence of signing step s26.

In another embodiment, registering $TR_{kA,kC1,kB,kC2}$ in the database is not performed by Carol's electronic device itself, but by another electronic device as an automatic consequence of signing step s26.

Step s30

In step s30, an action is caused to be performed by Carol's electronic device. The action is based on the transaction content information, i.e. the action that is triggered depends on the transaction content information. Further, the action is associated with levying a tax by Carol.

The method therefore reduces the latency (i.e., the delay) in the process of recording of the transaction in the database (steps s2 to s28) leading to the performance of the action based on the transaction content information (step s30). The method therefore provides a technical solution for monitoring transactions on a real-time (i.e., with low latency) and transaction-by-transaction basis. The monitoring may be performed by the third party, i.e. Carol.

In one embodiment, electronically signing a transaction record also involves time-stamping the transaction record, i.e. adding a timestamp to the transaction record data structure.

In one embodiment, determining s10 that $TR_{kA}$ is in accordance with a rule or set of rules comprises: verifying, by Carol's electronic device, based on the identifier for identifying Alice, the identifier for identifying Bob, and the transaction content information, the transaction conformity with the rule or set of rules. This may for example involve verifying that all the necessary information has been included in the transaction record, that the transaction is authorised, and that the selected VAT rate is correct.

In one embodiment, the transaction record further comprises a state variable indicating at least one of: (a) that the transaction record has been electronically signed (step s4) by Alice's electronic device; (b) that $TR_{kA}$ has been registered (step s6) in the database; (c) that Carol's electronic device has been notified (step s8) that $TR_{kA}$ has been registered in the database; (d) that $TR_{kA}$ has been determined (step s10) to be in accordance with the rule or set of rules and to have been electronically signed by Alice's electronic device; (e) that $TR_{kA}$ has been electronically signed (step s12) by Carol's electronic device; (f) that $TR_{kA,kC1}$ has been registered (step s14) in the database; (g) that Bob's electronic device has been notified (step s16) that $TR_{kA,kC1}$ has been registered in the database; (h) that $TR_{kA,kC1}$ has been electronically signed (step S18) by Bob's electronic device; (i) that $TR_{kA,kC1,kB}$ has been registered (step s20) in the database; (j) that Carol's electronic device has been notified (step s22) that $TR_{kA,kC1,kB}$ has been registered in the database; (k) that $TR_{kA,kC1,kB}$ has been determined (step s24) to have been electronically signed by Bob's electronic device; (l) that $TR_{kA,kC1,kB}$ has been electronically signed (step s26) by Carol's electronic device; (m) that $TR_{kA,kC1,kB,kC2}$ has been registered (step s28) in the database; and (n) that the action has been caused to be performed (step s30). In one embodiment, the state variable indicates whether each one of (a) to (n) is true or false.

The state variable therefore allows any authorized party to figure out, upon receiving or consulting a transaction record, which one of the above operations (a) to (n) have been performed. In other words, the status of the transaction record is logged in the database as part of the transaction record.

In one embodiment, the transaction relates to an object, and the object is marked with a code representing, or corresponding to, the transaction identifier. The object may for example be marked with the code immediately or shortly after creating the transaction record. The code may be marked on any part of the object. such as for example on the package surrounding the object's core.

The object may be of any type, such as for example, without being limited to, a bottle or can of beer, wine, liquor or soft-drink, a pack, packet or box of cigarettes or cigars, a medicine pack, a bottle of perfume, or any other excisable goods, a card, ticket, label, banderol, security foil, security thread or the like.

The code is a machine-readable code, which may for example comprise at least one of a linear barcode and a matrix barcode (e.g., a printed Data Matrix code or QR code). The code may represent the transaction identifier, or may correspond to the transaction identifier. The correspondence between the code and the transaction identifier may be a mathematical relationship (mathematically derivable correspondence) or may be stored in the database (registered correspondence).

Figure 2:
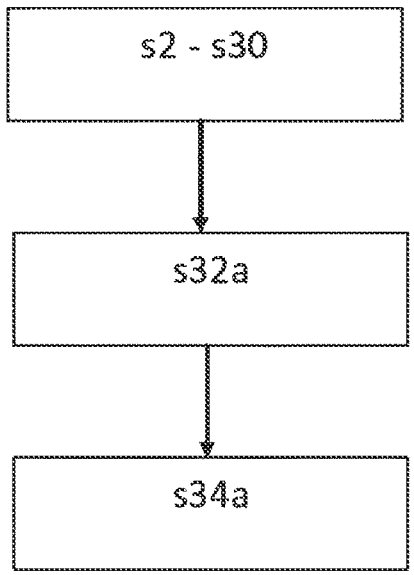
FIGS. 2 to 5 are four flowcharts of methods in four embodiments of the invention.

In one embodiment in which the transaction relates to an object, and in which the object is marked with a code representing, or corresponding to, the transaction identifier, the method further comprises the following steps, as illustrated by the flowchart of FIG. 2. The code marked on the object is read s32a, for example by a barcode reader or the like. It is then determined s34a, by querying the database, at least one of: (i) whether the action (referred to in step s30) has been performed for a transaction identified by the transaction identifier represented by, or corresponding to, the read code; and (ii) whether the object's nature matches the transaction content information of the transaction identified by the transaction identifier represented by, or corresponding to, the read code.

In one embodiment, the transaction relates to a service, and a document associated with the service is marked with a code representing, or corresponding to, the transaction identifier. The document may for example be marked with the code after creating the transaction record, such as immediately or shortly after creating the transaction record.

As mentioned above, the code is a machine-readable code, which may for example comprise at least one of a linear barcode and a matrix barcode (e.g., a printed Data Matrix code or QR code).

Figure 3:
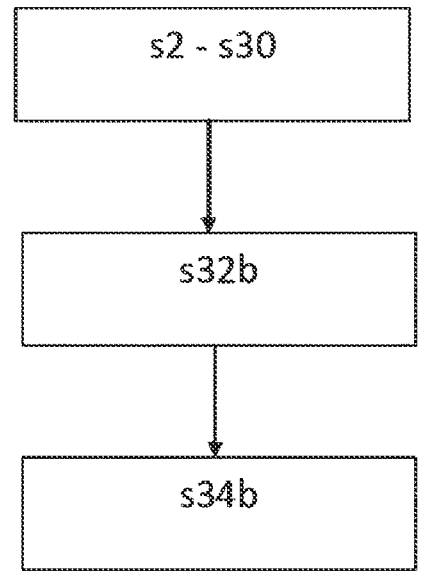

In one embodiment in which the transaction relates to a service, and in which a document associated with the service is marked with a code representing, or corresponding to, the transaction identifier, the method further comprises the following steps, as illustrated by the flowchart of FIG. 3, for example by a barcode reader or the like. The code marked on the document associated with the service is read s32b. It is then determined s34b, by querying the database, at least one of: (iii) whether the action (referred to in step s30) has been performed for a transaction identified by the transaction identifier represented by, or corresponding to, the read code; and (iv) whether the object's nature matches the transaction content information of the transaction identified by the transaction identifier represented by, or corresponding to, the read code.

In one embodiment, the transaction relates to an object, and the transaction identifier corresponds to a signature, hereinafter referred to as "object signature", generated based on at least one of: a property of the object, and a property of a material-based security element apposed on or attached to the object.

The above remarks as to the exemplary nature of the object also apply to the present embodiment.

Figure 4:
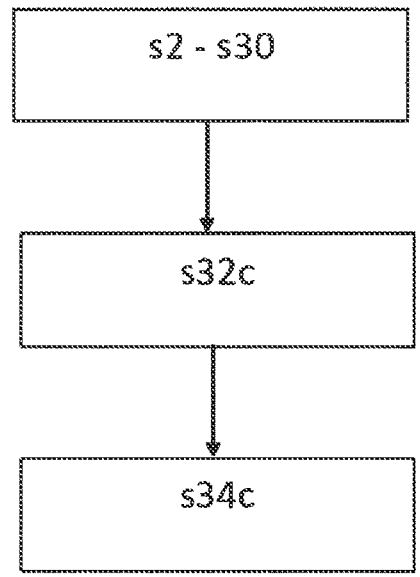

In that embodiment, the method may further comprise the following steps, as illustrated by the flowchart of FIG. 4. The object signature is obtained s32c using a suitable reader. It is then determined s34c, by querying the database, at least one of: (v) whether the action (referred to in step s30) has been performed for a transaction identified by the transaction identifier corresponding to the obtained object signature; and (vi) whether the object's nature matches the transaction content information of the transaction identified by the transaction identifier corresponding to the obtained object signature.

In one embodiment, the transaction relates to a service, and the transaction identifier corresponds to a signature, hereinafter referred to as "service-associated document signature", generated based on at least one of: a property of a document associated with the service, and a property of a material-based security element apposed on or attached to the document associated with the service.

Figure 5:
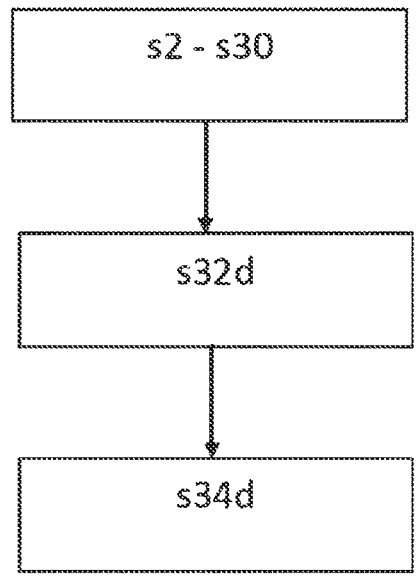

In that embodiment, the method may further comprise the following steps, as illustrated by the flowchart of FIG. 5. The service-associated document signature is obtained s32d using a suitable reader. It is then determined s34d, by querying the database, at least one of: (vii) whether the action (referred to in step s30) has been performed for a transaction identified by the transaction identifier corresponding to the obtained service-associated document signature; and (viii) whether the object's nature matches the transaction content information of the transaction identified by the transaction identifier corresponding to the obtained service-associated document signature.

Figure 6A:
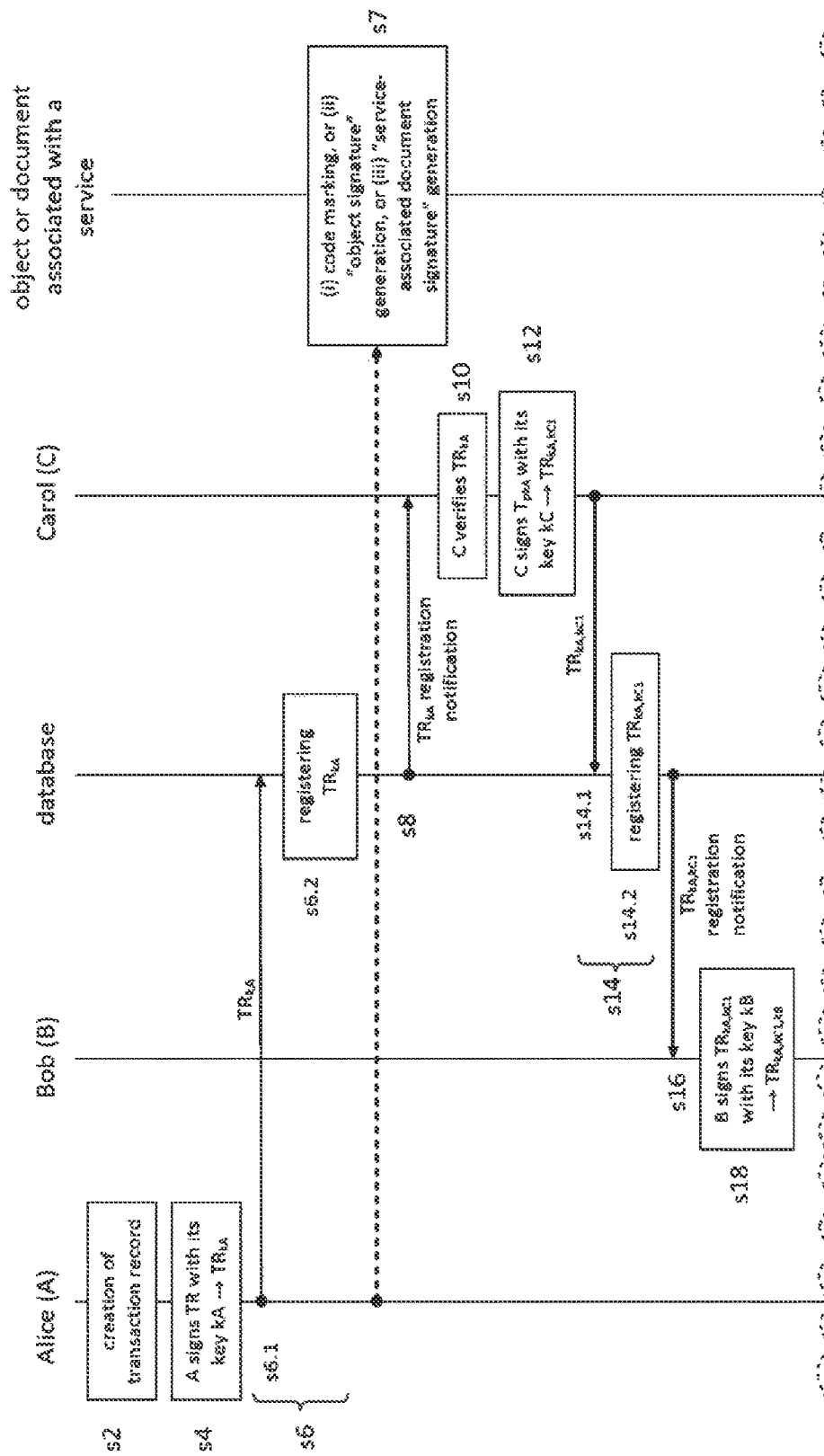
FIGS. 6a and 6b, which are to be read together, constitute a message sequence chart of methods in further embodiments of the invention.
Figure 6B:
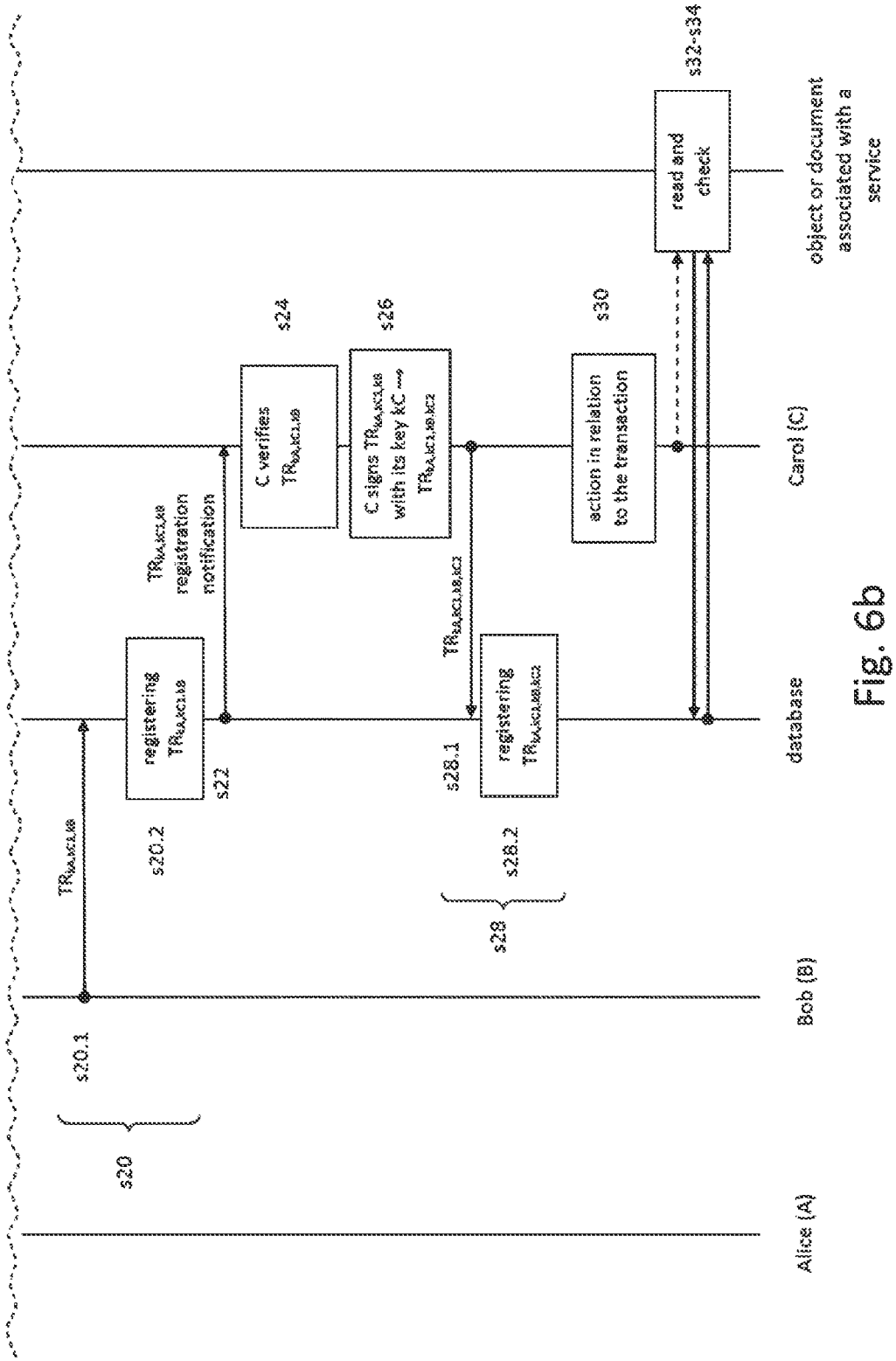

FIGS. 6a and 6b, which are to be read together, constitute a message sequence chart of methods in four embodiments of the invention. The methods differ from the method illustrated by FIGS. 1a and 1b in that they comprise the following additional steps.

In a first embodiment (as discussed for example with reference to FIG. 2), the object to which a transaction relates is marked s7 with a code (see FIG. 6a, step s7, "(i) code marking"). After this step of physically marking the object with a code, the object's code may later be read s32 and a track-and-trace determination may be performed s34 by querying the database (see FIG. 6b, steps s32-s34, "read and check").

In a second embodiment (as discussed for example with reference to FIG. 3), a document associated with the service to which a transaction relates is marked s7 with a code (see FIG. 6a, step s7, "(i) code marking"). After this step of physically marking the document with a code, the document's code may be read s32 and a track-and-trace determination may then be performed s34 by querying the database (see FIG. 6b, steps s32-s34, "read and check").

In a third embodiment (as discussed for example with reference to FIG. 4), an object signature of the object to which a transaction relates is generated s7 (see FIG. 6a, step s7, "(ii) "object signature" generation"). After generating the object signature, i.e. a physical signature of the object, the object signature may be obtained s32 and a track-and-trace determination may then be performed s34 by querying the database (see FIG. 6b, steps s32-s34, "read and check").

In a fourth embodiment (as discussed for example with reference to FIG. 5), a service-associated document signature of a document associated with the service to which a transaction relates is generated s7 (see FIG. 6a, step s7, "(iii) "service-associated document signature" generation"). After generating said service-associated document signature, i.e. a physical signature of the document, the service-associated document signature may then be obtained s32 and a track-and-trace determination may then be performed s34 by querying the database (see FIG. 6b, steps s32-s34, "read and check").

Step s7 is carried out by or at least controlled by Alice or by Alice's operators, as illustrated by the dotted arrow from Alice to the box illustrating step s7. Step s7 may be performed at any time after step s2. Steps s32-s34 are carried out by or at least controlled Carol or by Carol's operators on the field, as illustrated by the dotted arrow from Carol to the box illustrating steps s32-s34.

In one embodiment, any one of the above-referred object signature and the above-referred service-associated document signature comprises a material-based security element. A material-based security element is an element including a material of which a characteristic property relating to its specific nature and proportion allows materially authenticating the marked item by merely detecting said characteristic property. This material's characteristic property constitutes a material signature of the marking. For example, the material-based security element may be provided in the form of a luminescing material. The luminescence may be revealed under non-visible light, e.g. ultraviolet light or infrared light. Alternatively, the luminescence may be revealed upon application of visible light. The luminescent material may be an up converting luminescent material or a down converting luminescent material. The luminescent material may be a phosphorescent or fluorescent material, particularly when combined with the decay half-life or other decay time material characteristic. The marking may be printed with an ink including said luminescent material (as luminescent pigments). A specific reader may be necessary for detecting the material signature of a marking including a given material-based security element for example, in case of a fluorescent ink, the reader must illuminate the ink with an appropriate excitation light and then detect the luminescence light emitted by the ink, and for example, be capable of detecting and measuring a decay time rate (i.e. the physical characteristic) of this luminescence light.

The embodiments illustrated with reference to FIGS. 2 to 6 allow the implementation of an efficient track and trace solution in combination with the method of registering the transaction in the database. In other words, the physical marking on the objects, and/or on documents associated with services, or the material signature thereof, notably enables to find out the status of the transaction by querying the database. Especially, whether the action has been duly performed can be identified, and/or whether the object nature matches the expected nature of the object in accordance with the information in the database can also be identified. This may enable the detection of fraud.

The action of above-described step s30 is associated with levying a tax by Carol, such as for example a VAT or GST.

As mentioned above, the method illustrated with reference to FIGS. 1a and 1b reduces the latency in the process of recording of a transaction in the database leading to the performance of action based on the transaction content information. The method therefore provides a technical solution for monitoring transactions on a real-time (i.e., with low latency) and transaction-by-transaction basis. This has considerable collateral advantages when the action of step s30 is associated with levying a tax, such as for example a VAT or GST. This may be explained as follows.

At the time of writing, VAT collection in most countries is mostly delegated to all economic actors, assuming that each actor will duly comply with the applicable rules. In order to ensure that the rules are complied with, the tax authority is conducting audits, and fines and penalties are used to deter fraud, but with limited success. Indeed, the VAT collection process involves many actors, with millions (if not billions) of transactions, so that it is virtually impossible for the tax authority to prevent fraud. An example of VAT fraud is the non-correspondence of the same invoice on both the seller and buyer sides. In particular, a pseudo-buyer may issue a false invoice for a good that has never been purchased, claiming a VAT refund of a non-existing purchase. Furthermore, the conventional VAT collection is affected by an inherent latency caused by both the accounting-driven bundling of invoices and the legal requirements according to which economic actors must issue VAT declarations only periodically (e.g., every month, every quarter, or every year).

When the action of step s30 is associated with levying a tax, the solution described with reference to FIGS. 1a and 1b provides technical means to record, track, report, settle and audit VAT transactions between trustless parties, i.e. Alice who may be the seller, Bob who may be the buyer, and Carol who may be the tax authority. This may be achieved by replacing the conventional VAT invoices by transaction records into the database, so as to automatically record, track and settle the corresponding VAT transactions on a transaction-by-transaction basis and with low latency. A VAT transaction may for example be encoded into a so-called smart contract automatically executing the settlement of the VAT between the different parties on a blockchain-based database.

In one embodiment, upon electronically signing $TR_{kA}$ by Carol's electronic device (step s12), for example using Carol's key, an account associated with Alice is debited from an amount representing a tax on the added value that is considered to result from the transaction; and, upon determining s24 that $TR_{kA,kC1,kB}$ has been electronically signed by Bob's electronic device, an account associated with Bob is credited by the amount. In other words, in that embodiment, Carol's signature triggers the debit of Alice's account, and the determination that $TR_{kA,kC1,kB}$ has been electronically signed by Bob's electronic device triggers the credit of Bob's account.

Such an embodiment is advantageous in that the tax, such as VAT, may be collected (or accounted for) in a transaction per transaction basis, in an automatic manner, and with low latency, in such a manner that the opportunities to commit fraud (such as the so-called missing trader fraud and carousel fraud) are reduced. A company (usually a small one) will not be able to suddenly generate a totally abnormal amount of transactions (with respect to its size and type of business) during weeks or months, thus owing a very large amount of VAT to the tax authority (and then suddenly disappearing without paying the owed amounts) before the next tax self-declaration filing. With the above-described transaction-by-transaction based method and system, the tax authority can see in real time the level of VAT owed by each company and is able to detect potential fraudster and intervene, before the company accumulates abnormal VAT debts.

In another embodiment, an account associated with Alice is debited from an amount representing a tax on the added value that is considered to result from the transaction only when $TR_{kA,kC1,kB}$ has been electronically signed by Bob's electronic device, not before that.

Figure 7:
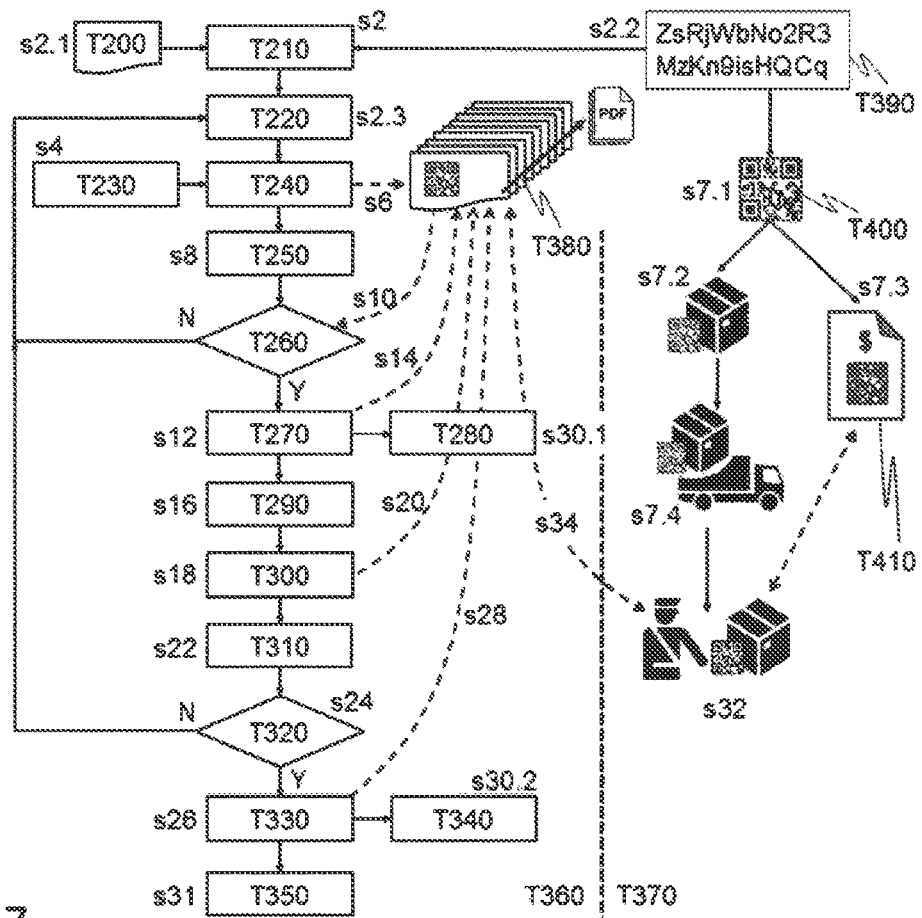
FIG. 7 is a flowchart of a method according to one embodiment of the invention.

FIG. 7 is a flowchart of a method in a further embodiment of the invention. The method comprises the following steps.

Based on a so-called smart contract template T200 (i.e., a template for creating a transaction record) (see sub-step s2.1 on FIG. 7) and on a smart contract identifier T390 (i.e., a transaction identifier) (see sub-step s2.2 on FIG. 7), a smart contract (i.e., a transaction record) is created T210. Alice may then input T220 parameters into the smart contract (see sub-step s2.3 on FIG. 7). (This corresponds to step s2 discussed for example with reference to FIG. 1a.)

Alice's electronic device then electronically signs T230 the smart contract (which becomes $TR_{kA}$), before submitting it T240 to the database T380, which may for example be an immutable ledger. (This corresponds to steps s4 and s6 discussed for example with reference to FIG. 1a.)

The registration of the smart contract into the database is then notified T250 to Carol's electronic device. (This corresponds to step s8 discussed for example with reference to FIG. 1a.)

Carol's electronic device then performs T260 a conformity check and verifies T260 whether the smart contract has been duly signed by Alice's electronic device. (This corresponds to step s10 discussed for example with reference to FIG. 1a.) If the determination T260 fails, the process may for example return to step T220. If the determination T260 succeeds, Carol's electronic device then electronically signs T270 the smart contract (which becomes $TR_{kA,kC1}$) and submits it to the database T380. (This corresponds to steps s12 and s14 discussed for example with reference to FIG. 1a.) Carol's electronic device (the tax authority) then debits T280 the tax account of Alice.

The registration of the smart contract into the database is then notified T290 to Bob's electronic device. (This corresponds to step s16 discussed for example with reference to FIG. 1a.)

Bob's electronic device then electronically signs T300 the smart contract (which becomes $TR_{kA,kC1,kB}$) and submits it to the database T380. (This corresponds to steps s18 and s20 discussed for example with reference to FIGS. 1a and 1b.)

The registration of the smart contract into the database is then notified T310 to Carol's electronic device, i.e. the tax authority. (This corresponds to step s22 discussed for example with reference to FIG. 1b.) Carol's electronic device then verifies T320 whether the smart contract has been signed by Bob's electronic device. (This corresponds to step s24 discussed for example with reference to FIG. 1b.) If the determination T320 fails, the process may for example return to step T220. If the determination T320 succeeds, Carol's electronic device then electronically signs T330 the smart contract (which becomes $TR_{kA,kC1,kB,KC2}$) and submits it to the database. (This corresponds to steps s26 and s28 discussed for example with reference to FIG. 1b.) Carol's electronic device (the tax authority) then credits T340 the tax account of Bob. The transaction is then considered to be completed T350/s31.

The above-described steps may be regarded as forming the "digital part" T360 of the method and system. In parallel, a "physical marking" part T370 is also illustrated on the right-hand side of FIG. 7. In that part, a code T400/s7.1 (smart contract identifier) may be marked on the object s7.2, on the invoice T410/s7.3, and even on the package containing corresponding objects s7.4. (This corresponds to step s7 discussed for example with reference to FIG. 6a.) Later, a track- and trace check may be performed s32/s34 on behalf of the tax authority, as discussed for example with reference to FIG. 6b.

Thanks to the above method, the tax authority (i.e., Carol) is able to monitor in real-time (i.e. with low latency) the tax credit status of any taxpayer (i.e. including Alice and Bob). To do so, the database (e.g. the blockchain ledger) may be consulted, allowing the concatenation of all debit and credit operations assigned to Alice, as result of all previous transactions, as well as the effective payments from and to Alice. For any taxpayer for whom there is a suspicion of fraud, such as for example Alice, the tax authority may set maximum limits of tax debt (such as a threshold value). If Alice reaches this limit and wants to create new transactions (i.e., to invoice new sales), the tax authority can undertake some actions before allowing further transactions. These actions may for example comprise sending an auditor to Alice's premises, requesting guarantees from Alice (e.g., a bank guarantee) to secure a higher tax debt, reducing the current debt by a payment, etc. Blocking any further transaction may even be considered.

Furthermore, for each transaction, the existence of the seller (Alice) and of the buyer (Bob) in the official register of taxpayers may be checked by the tax authority (Carol). The signature authorizations of the persons who electronically sign on behalf of their legal entities (Alice or Bob) may also be checked on the official register of taxpayers and/or the commercial register.

Yet furthermore, the relevance of the data entered by Alice in the smart contract may be checked. This may for instance comprise: (i) whether the tax class (i.e. the tax rate that will be applied) corresponds to the goods which are described (e.g. the reduced tax rate applicable to food is not necessarily valid for luxury goods); (ii) whether Alice and Bob are registered as taxpayers; and (iii) whether the value of the transaction is specified.

Furthermore, whether the electronic signatures are indeed valid may be checked (i.e. they correspond to authorized signees of Alice or Bob companies).

Yet furthermore, analyzing the data contained in the database enables the detection of potential fraudulent behaviors from taxpayers (e.g. Alice or Bob). This may be done by the recognition of specific patterns or specific combination of patterns, such as:
  a. Small companies
  b. Companies recently acquired
  c. Recent change in the company board and/or management
  d. Frequent change of the person signing the transactions (with respect to the size of the company)
  e. Business outside the usual scope of the company (e.g. a restaurant starting to sell electronic goods)
  f. Volume of sales becoming suddenly very important
  g. Purchases in a different county (import)
  h. Late payments of the due taxes When there is a suspicion of fraud, the tax authority may trigger different kind of actions:
  i. Simple request for explanations
  j. Physical inspections of the company premises
  k. Physical audit of the company personnel, directors and board
  l. Physical inspection of the goods, in Alice and/or Bob premises
  m. Physical inspection of the goods during shipment (along all the supply chain)

For critical goods or products, the tax authority may request to include in the smart contract some identification information about the products subject to the transaction. This may be serial numbers, secured identification identifiers, or the like. This allows a full traceability of these critical goods so as to fight counterfeits.

Figure 8:
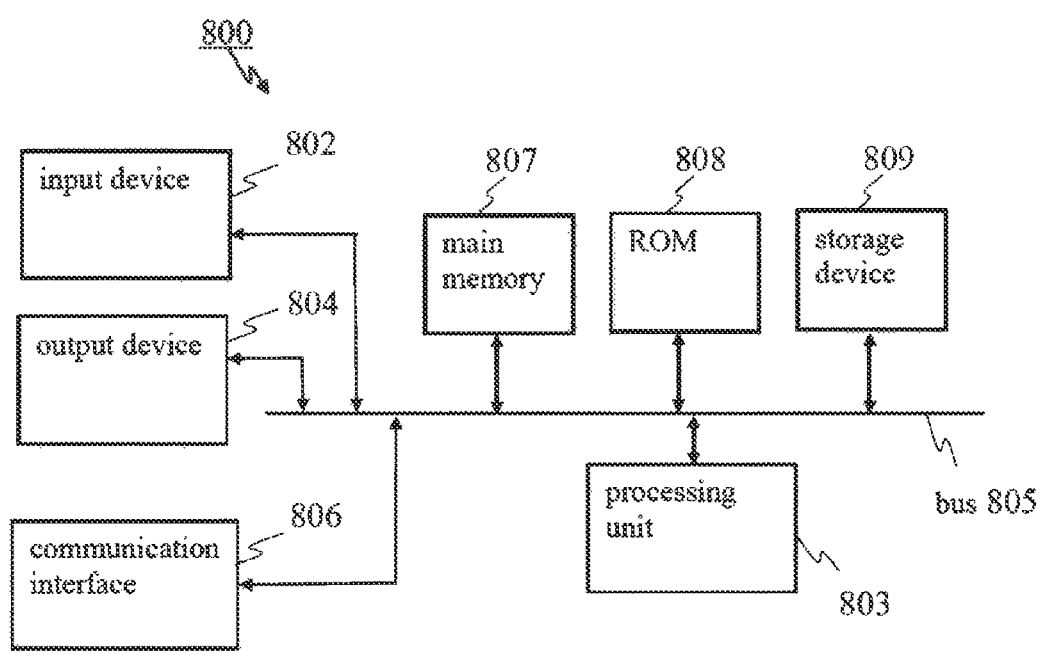
FIG. 8 is a schematic diagram of an exemplary implementation of an electronic device in one embodiment of the invention.

FIG. 8 is a schematic diagram of an exemplary implementation of an electronic device 800 that may be used for example as Alice, Bob's, or Carol's electronic device, in a method or system according to the invention.

As illustrated by FIG. 8, electronic device 800 comprises a computing unit that may include a bus 805, a processing unit 803, a main memory 807, a ROM 808, a storage device 809, an input device 802, an output device 804, and a communication interface 806. Bus 805 may include a path that permits communication among the components of electronic device 800.

Processing unit 803 may include a processor, a microprocessor, or processing logic that may interpret and execute instructions. Main memory 807 may include a RAM or another type of dynamic storage device that may store information and instructions for execution by processing unit 803. ROM 808 may include a ROM device or another type of static storage device that may store static information and instructions for use by processing unit 803. Storage device 809 may include a magnetic and/or optical recording medium and its corresponding drive.

Input device 802 may include a mechanism that permits an operator to input information to processing unit 803, such as a keypad, a keyboard, a mouse, a pen, voice recognition and/or biometric mechanisms, etc. Output device 804 may include a mechanism that outputs information to the operator, including a display, a printer, a speaker, etc. Communication interface 806 may include any transceiver-like mechanism that enables electronic device 800 to communicate with other devices and/or systems (such as with a base station, a WLAN access point, etc.). For example, communication interface 806 may include mechanisms for communicating with another device or system via a network.

Electronic device 800 may perform certain operations or processes described herein. These operations may be performed in response to processing unit 803 executing software instructions contained in a computer-readable medium, such as main memory 807, ROM 808, and/or storage device 809. A computer-readable medium may be defined as a physical or a logical memory device. For example, a logical memory device may include memory space within a single physical memory device or distributed across multiple physical memory devices. Each of main memory 807, ROM 808 and storage device 809 may include computer-readable media. The magnetic and/or optical recording media (e.g., readable CDs or DVDs) of storage device 809 may also include computer-readable media. The software instructions may be read into main memory 807 from another computer-readable medium, such as storage device 809, or from another device via communication interface 806.

The software instructions contained in main memory 809 may cause processing unit 803 to perform operations or processes described herein, such as for example decoding a machine-readable code. Alternatively, hardwired circuitry may be used in place of or in combination with software instructions to implement processes and/or operations described herein. Thus, implementations described herein are not limited to any specific combination of hardware and software.

Any one of the above-referred elements may be implemented in hardware, software, field-programmable gate array (FPGA), application-specific integrated circuit (ASICs), firmware or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

ASICs application-specific integrated circuit
FPGA field-programmable gate array
GST goods and services tax
kA Alice's key
kB Bob's key
kC Carol's key
TR transaction record
VAT value-added tax

The invention claimed is:

1. A method for registering, in a database being an immutable blockchain ledger, a transaction between a first party's electronic device and a second party's electronic device, and for causing a third party's electronic device to perform an action in relation to the transaction, wherein the first party's electronic device, the second party's electronic device and the third party's electronic device are capable of communicating with the database over a communication network and capable of transmitting electronically signing data over the communication network, wherein the method comprises:

based on a smart contract template, creating, by the first party's electronic device, a transaction record being a smart contract encoding the transaction, the transaction record comprising:

a transaction identifier, for identifying the transaction,
an identifier for identifying the first party,
an identifier for identifying the second party, and
transaction content information, relating to at least one of the nature of the transaction and a value that the transaction is considered to have;

by the first party's electronic device, modifying a data structure of the transaction record to include an electronic signature of the first party's electronic device to create a first resulting transaction record and transmitting the first resulting transaction record to the database over the communication network, the electronic signature of the first party's electronic device being inputted by using a private key of the first party's electronic device;

upon receipt of the transmitted first resulting transaction by the database, automatically registering the transmitted first resulting transaction record in the database;

automatically transmitting over the communication network a notification to the third party's electronic device notifying that the first resulting transaction record has been registered in the database;

transmitting the first resulting transaction record to the third party's electronic device over the communication network;

determining, by the third party's electronic device, that the first resulting transaction record is in accordance with a rule or set of rules and includes the electronic signature of the first party's electronic device, wherein determining that the first resulting transaction record is in accordance with the rule or set of rules comprises verifying, based on the identifier for identifying the first party, the identifier for identifying the second party, and the transaction content information, transaction conformity with the rule or set of rules;

when the determination that the first resulting transaction record is in accordance with the rule or set of rules and includes the electronic signature of the first party's electronic device succeeds, by the third party's electronic device, modifying a data structure of the first resulting transaction record to include an electronic signature of the third party's electronic device to create a second resulting transaction record and transmitting the second resulting transaction record to the database over the communication network, the electronic signature of the third party's electronic device being inputted by using a private key of the third party's electronic device;

upon modifying the data structure of the first resulting transaction record by the third party's electronic device, automatically debiting an account associated with the first party from an amount representing a tax on an added value that is considered to result from the transaction;

upon receipt of the transmitted second resulting transaction by the database, automatically registering the transmitted second resulting transaction record in the database;

automatically transmitting over the communication network a notification to the second party's electronic device notifying that the second resulting transaction record has been registered in the database;

transmitting the second resulting transaction record to the second party's electronic device over the communication network;

by the second party's electronic device, modifying a data structure of the second resulting transaction record to include an electronic signature of the second party's electronic device to create a third resulting transaction record and transmitting the third resulting transaction record to the database over the communication network, the electronic signature of the second party's electronic device being inputted by using a private key of the second party's electronic device;

upon receipt of the transmitted third resulting transaction by the database, automatically registering the transmitted third resulting transaction record in the database;

automatically notifying the third party's electronic device that the third resulting transaction record has been registered in the database, and determining, by the third party's electronic device, whether the third resulting transaction record includes the electronic signature of the second party's electronic device;

when the determination that the third resulting transaction record includes the electronic signature of the second party's electronic device succeeds, by the third party's electronic device, modifying a data structure of the third resulting transaction record to include an electronic signature of the second party's electronic device to create a fourth resulting transaction record and transmitting the fourth resulting transaction record to the database over the communication network, the electronic signature of the third party's electronic device being inputted by using a private key of the third party's electronic device;

upon determining, by the third party's electronic device, that the third resulting transaction record includes the electronic signature of the second party's electronic device, automatically crediting an account associated with the second party by the amount;

upon receipt of the transmitted fourth resulting transaction by the database, automatically registering the transmitted fourth resulting transaction record in the database; and causing the third party's electronic device to perform the action based on the transaction content information of the transaction record, wherein the transaction relates to an object, and the object is marked with a code representing, or corresponding to, the transaction identifier; or wherein the transaction relates to a service, and a document associated with the service is marked with a code representing, or corresponding to, the transaction identifier.

2. The method of claim 1, wherein the transaction record further comprises a state variable indicating at least one of:
that the transaction record has been electronically signed by the first party's electronic device;
that the first resulting transaction record has been registered in the database;
that the third party's electronic device has been notified that the first resulting transaction record has been registered in the database;
that the first resulting transaction record has been determined to be in accordance with the rule or set of rules and to have been electronically signed by the first party's electronic device;
that the first resulting transaction record has been electronically signed by the third party's electronic device;
that the second resulting transaction record has been registered in the database;
that the second party's electronic device has been notified that the second resulting transaction record has been registered in the database;

that the second resulting transaction record has been electronically signed by the second party's electronic device;
that the third resulting transaction record has been registered in the database;
that the third party's electronic device has been notified that the third resulting transaction record has been registered in the database; and
that the third resulting transaction record has been determined to have been electronically signed by the second party's electronic device;
that the third resulting transaction record has been electronically signed by the third party's electronic device;
that the fourth resulting transaction record has been registered in the database; and
that the action has been caused to be performed.

3. The method of claim 1, wherein the transaction relates to the object and the method further comprises marking the object with the code after creating the transaction record.

4. The method of claim 1, wherein the transaction relates to the object and the method further comprises:
reading the code marked on the object; and
determining, by querying the database, at least one of:
whether the action has been performed for a transaction identified by the transaction identifier represented by, or corresponding to, the read code; and
whether the object's nature matches the transaction content information of the transaction identified by the transaction identifier represented by, or corresponding to, the read code.

5. The method of claim 1, wherein the transaction relates to the service and the method further comprises marking the document with the code after creating the transaction record.

6. The method of claim 1, wherein the transaction relates to the service and the method further comprises:
reading the code marked on the document associated with the service; and
determining, by querying the database, at least one of:
whether the action has been performed for a transaction identified by the transaction identifier represented by, or corresponding to, the read code; and
whether the object's nature matches the transaction content information of the transaction identified by the transaction identifier represented by, or corresponding to, the read code.

7. The method according to claim 1, wherein when the transaction relates to an object, the transaction identifier corresponds to an object signature, generated based on at least one of:
a property of the object; and
a property of a material-based security element apposed on or attached to the object.

8. The method of claim 7, further comprising:
obtaining the object signature; and
determining, by querying the database, at least one of:
whether the action has been performed for a transaction identified by the transaction identifier corresponding to the obtained object signature; and
whether the object's nature matches the transaction content information of the transaction identified by the transaction identifier corresponding to the obtained object signature.

9. The method according to claim 1, wherein when the transaction relates to a service, the transaction identifier corresponds to a service-associated document signature, generated based on at least one of:
a property of a document associated with the service; and
a property of a material-based security element apposed on or attached to the document associated with the service.

10. The method of claim 9, further comprising:
obtaining the service-associated document signature; and
determining, by querying the database, at least one of:
whether the action has been performed for a transaction identified by the transaction identifier corresponding to the obtained service-associated document signature; and
whether the object's nature matches the transaction content information of the transaction identified by the transaction identifier corresponding to the obtained service-associated document signature.

11. A system for registering, in a database being an immutable blockchain ledger, a transaction between a first party's electronic device and a second party's electronic device, and for causing a third party's electronic device to perform an action in relation to the transaction, wherein the first party, the second party and the third party, the electronic devices are capable of communicating with the database over a communication network and capable of transmitting electronically signing data over the communication network, wherein the system is configured for:
based on a smart contract template, creating, by the first party's electronic device, a transaction record being a smart contract encoding a transaction, the transaction record comprising
a transaction identifier, for identifying the transaction,
an identifier for identifying the first party,
an identifier for identifying the second party, and
transaction content information, relating to at least one of the nature of the transaction and a value that the transaction is considered to have;
by the first party's electronic device, modifying a data structure of the transaction record to include an electronic signature of the first party's electronic device to create a first resulting transaction record and transmitting the first resulting transaction record to the database over the communication network, the electronic signature of the first party's electronic device being inputted by using a private key of the first party's electronic device;
upon receipt of the transmitted first resulting transaction by the database, automatically registering the transmitted first resulting transaction record in the database;
automatically transmitting over the communication network a notification to the third party's electronic device notifying that the first resulting transaction record has been registered in the database;
transmitting the first resulting transaction record to the third party's electronic device over the communication network;
determining, by the third party's electronic device, that the first resulting transaction record is in accordance with a rule or set of rules and includes the electronic signature of the first party's electronic device, wherein determining that the first resulting transaction record is in accordance with the rule or set of rules comprises verifying, based on the identifier for identifying the first party, the identifier for identifying the second party, and the transaction content information, the transaction conformity with the rule or set of rules;
when the determination that the first resulting transaction record is in accordance with the rule or set of rules and includes the electronic signature of the first party's electronic device succeeds, by the third party's electronic device, modifying a data structure of the first resulting transaction record to include the electronic signature of the third party's electronic device to create a second resulting transaction record and transmitting the second resulting transaction record to the database over the communication network, the electronic signature of the third party's electronic device being inputted by using a private key of the third party's electronic device;

upon modifying the data structure of the first resulting transaction record by the third party's electronic device, automatically debiting an account associated with the first party from an amount representing a tax on an added value that is considered to result from the transaction;

upon receipt of the transmitted second resulting transaction by the database, automatically registering the transmitted second resulting transaction record in the database;

automatically transmitting over the communication network a notification to the second party's electronic device notifying that the second resulting transaction record has been registered in the database;

transmitting the second resulting transaction record to the second party's electronic device over the communication network;

by the second party's electronic device, modifying a data structure of the second resulting transaction record to include an electronic signature of the second party's electronic device to create a third resulting transaction record and transmitting the third resulting transaction record to the database over the communication network, the electronic signature of the second party's electronic device being inputted by using a private key of the second party's electronic device;

upon receipt of the transmitted third resulting transaction by the database, automatically registering the transmitted third resulting transaction record in the database;

automatically notifying the third party's electronic device that the third resulting transaction record has been registered in the database; and, determining, by the third party's electronic device, whether the third resulting transaction record includes the electronic signature of the second party's electronic device;

when the determination that the third resulting transaction record includes the electronic signature of the second party's electronic device succeeds, by the third party's electronic device, modifying a data structure of the third resulting transaction record to include an electronic signature of the second party's electronic device to create a fourth resulting transaction record and transmitting the fourth resulting transaction record to the database over the communication network, the electronic signature of the third party's electronic device being inputted by using a private key of the third party's electronic device;

upon determining, by the third party's electronic device, that the third resulting transaction record includes the electronic signature of the second party's electronic device, automatically crediting an account associated with the second party by the amount;

upon receipt of the transmitted fourth resulting transaction by the database, automatically registering the transmitted fourth resulting transaction record in the database, and causing the third party's electronic device to perform the action based on the transaction content information of the transaction record, wherein the transaction relates to an object, and the object is marked with a code representing, or corresponding to, the transaction identifier; or wherein the transaction relates to a service, and a document associated with the service is marked with a code representing, or corresponding to, the transaction identifier.

12. A computer program product comprising computer-readable instructions included in a non-transitory computer-readable medium configured, when executed on an electronic device or set of electronic devices, to cause the electronic device or set of electronic devices to perform operations comprising of:

based on a smart contract template, creating, by a first party's electronic device, a transaction record being a smart contract encoding a transaction, the transaction record comprising:
 a transaction identifier, for identifying the transaction,
 an identifier for identifying the first party,
 an identifier for identifying the second party, and
 transaction content information, relating to at least one of the nature of the transaction and a value that the transaction is considered to have;

by the first party's electronic device, modifying a data structure of the transaction record to include an electronic signature of the first party's electronic device to create a first resulting transaction record and transmitting the first resulting transaction record to the database, the electronic signature of the first party's electronic device being inputted by using a private key of the first party's electronic device;

upon receipt of the transmitted first resulting transaction by the database, automatically registering the transmitted first resulting transaction record in the database;

automatically transmitting over the communication network a notification to the third party's electronic device notifying that the first resulting transaction record has been registered in the database;

transmitting the first resulting transaction record to the third party's electronic device over the communication network;

determining, by the third party's electronic device, that the first resulting transaction record is in accordance with a rule or set of rules and includes the electronic signature of the first party's electronic device, wherein determining that the first resulting transaction record is in accordance with the rule or set of rules comprises verifying, based on the identifier for identifying the first party, the identifier for identifying the second party, and the transaction content information, transaction conformity with the rule or set of rules;

when the determination that the first resulting transaction record is in accordance with the rule or set of rules and includes the electronic signature of the first party's electronic device succeeds, by the third party's electronic device, modifying a data structure of the first resulting transaction record to include an electronic signature of the third party's electronic device to create a second resulting transaction record and transmitting the second resulting transaction record to the database over the communication network, the electronic signature of the third party's electronic device being inputted by using a private key of the third party's electronic device;

upon modifying the data structure of the first resulting transaction record by the third party's electronic device, automatically debiting an account associated with the first party from an amount representing a tax on an added value that is considered to result from the transaction;

upon receipt of the transmitted second resulting transaction by the database, automatically registering the transmitted second resulting transaction record in the database;

automatically transmitting over the communication network a notification to the second party's electronic device notifying that the second transmitting transaction record has been registered in the database;

transmitting the second resulting transaction record to the second party's electronic device over the communication network;

by the second party's electronic device, modifying a data structure of the second resulting transaction record to include an electronic signature of the second party's electronic device to create a third resulting transaction record and transmitting the third resulting transaction record to the database over the communication network, the electronic signature of the second party's electronic device being inputted by using a private key of the second party's electronic device;

upon receipt of the transmitted third resulting transaction by the database, automatically registering the transmitted third resulting transaction record in the database;

automatically notifying the third party's electronic device that the third resulting transaction record has been registered in the database, and determining, by the third party's electronic device, whether the third resulting transaction record includes the electronic signature of the second party's electronic device;

when the determination that the third resulting transaction record includes the electronic signature of the second party's electronic device succeeds, by the third party's electronic device, modifying a data structure of the third resulting transaction record to include an electronic signature of the second party's electronic device to create a fourth resulting transaction record and transmitting the fourth resulting transaction record to the database over the communication network, the electronic signature of the third party's electronic device being inputted by using a private key of the third party's electronic device;

upon determining, by the third party's electronic device, that the third resulting transaction record includes the electronic signature of the second party's electronic device, automatically crediting an account associated with the second party by the amount;

upon receipt of the transmitted fourth resulting transaction by the database, automatically registering the transmitted fourth resulting transaction record in the database; and causing the third party's electronic device to perform the action based on the transaction content information of the transaction record, wherein the transaction relates to an object, and the object is marked with a code representing, or corresponding to, the transaction identifier; or wherein the transaction relates to a service, and a document associated with the service is marked with a code representing, or corresponding to, the transaction identifier.

* * * * *